US011632242B2

(12) United States Patent
Beckwith

(10) Patent No.: US 11,632,242 B2
(45) Date of Patent: Apr. 18, 2023

(54) LOW FOOTPRINT HARDWARE ARCHITECTURE FOR KYBER-KEM

(71) Applicant: PQSecure Technologies, LLC, Boca Raton, FL (US)

(72) Inventor: Luke Beckwith, Boca Raton, FL (US)

(73) Assignee: PQSecure Technologies, LLC, Boca Raton, FL (US)

( * ) Notice: Subject to any disclaimer, the term of this patent is extended or adjusted under 35 U.S.C. 154(b) by 0 days.

(21) Appl. No.: 17/641,746

(22) PCT Filed: Dec. 30, 2020

(86) PCT No.: PCT/US2020/067595
§ 371 (c)(1),
(2) Date: Mar. 9, 2022

(87) PCT Pub. No.: WO2022/146436
PCT Pub. Date: Jul. 7, 2022

(65) Prior Publication Data
US 2022/0353066 A1    Nov. 3, 2022

(51) Int. Cl.
*H04L 29/06* (2006.01)
*H04L 9/08* (2006.01)
*H04L 9/30* (2006.01)

(52) U.S. Cl.
CPC .......... *H04L 9/0841* (2013.01); *H04L 9/0858* (2013.01); *H04L 9/3006* (2013.01)

(58) Field of Classification Search
CPC ... H04L 9/0841; H04L 9/0858; H04L 9/3006; G06F 21/602; G06F 21/72
See application file for complete search history.

(56) References Cited

U.S. PATENT DOCUMENTS 1,081,226 A    12/1913 Forst
11,218,300 B1 *  1/2022 Shea ............... H04L 9/0897
(Continued)

FOREIGN PATENT DOCUMENTS

CN    110519058 A  * 11/2019  ........... G06F 21/123
CN    114270352 A  *  4/2022  ........... G06F 21/123
(Continued)

OTHER PUBLICATIONS

Banerjee et al. "Sapphire: A Configuarable Crypto-Processor for Post-Quantum Lattice-based Protocols." [Oct. 25, 2019] < URL: https://andv.org/abs/1910.07557 >.
(Continued)

*Primary Examiner* — Sher A Khan
(74) *Attorney, Agent, or Firm* — Mark C. Johnson; Johnson Dalal

(57) ABSTRACT

A computer processing hardware architecture system for the Kyber lattice-based cryptosystem which is created with high resource reuse in the compression and decompression module, the operation unit, the binomial samplers, and the operation ordering, wherein the architecture system includes an internal controller operably configured to independently accelerate a plurality of cryptographic Kyber algorithms at all NIST-recommended post-quantum cryptography security levels and is operably coupled to a singular module operably configured to perform compression and decompression as specified in Kyber, perform arithmetic operations utilized in the plurality of cryptographic Kyber algorithms, and reuse hardware resources for all the arithmetic operations utilized in the plurality of cryptographic Kyber algorithms.

10 Claims, 12 Drawing Sheets

(56) References Cited

U.S. PATENT DOCUMENTS

| | | | | |
|---|---|---|---|---|
| 11,218,471 | B1* | 1/2022 | Stapleton | G06N 10/00 |
| 11,322,050 | B1* | 5/2022 | Arbajian | G09C 1/00 |
| 11,334,667 | B1* | 5/2022 | Ramanathan | H04L 9/0861 |
| 11,336,462 | B1* | 5/2022 | Maganti | H04L 9/0844 |
| 11,343,270 | B1* | 5/2022 | Carter, Jr. | H04L 9/088 |
| 11,356,247 | B1* | 6/2022 | Carter, Jr. | H04L 9/0852 |
| 11,366,897 | B1* | 6/2022 | Ramanathan | H04L 9/3263 |
| 11,449,799 | B1* | 9/2022 | Arbajian | G06N 5/04 |
| 11,562,079 | B2* | 1/2023 | Mayer | G06F 12/1466 |
| 2006/0242429 | A1* | 10/2006 | Holtzman | H04L 9/3236 |
| | | | | 713/160 |
| 2019/0319804 | A1* | 10/2019 | Mathew | H04L 9/3247 |
| 2020/0265167 | A1 | 8/2020 | Banerjee et al. | |
| 2022/0006835 | A1* | 1/2022 | Gray | H04L 9/085 |

FOREIGN PATENT DOCUMENTS

| | | | | |
|---|---|---|---|---|
| EP | 3547603 A1 * | 10/2019 | | H04L 9/0819 |
| EP | 3754896 A1 * | 12/2020 | | H04L 9/0844 |
| GB | 2585885 A * | 1/2021 | | G06F 21/60 |
| GB | 2601926 A * | 6/2022 | | G06F 21/6209 |
| WO | WO-2021009554 A1 * | 1/2021 | | |

OTHER PUBLICATIONS

Basu et al. "NIST Post-Quantum Cryptography-A Hardware Evaluation Study" [Mar. 3, 2021] < URL: ia.cr/2019/047 >.

* cited by examiner

Performance Results

| Security Level | Key Generation Cycles | Encapsulation Cycles | Decapsulation Cycles | E+D Cycles |
|---|---|---|---|---|
| 512 | 214,798 | 287,753 | 306,891 | 594,644 |
| 768 | 354,463 | 461,904 | 484,916 | 946,820 |
| 1024 | 562,649 | 694,647 | 722,093 | 1,416,740 |

ASIC Area Results

| Area [kGe] | SRAM [KB] | Frequency [MHz] |
|---|---|---|
| 24.17 | 10 | 250 |

FIG. 12

LOW FOOTPRINT HARDWARE ARCHITECTURE FOR KYBER-KEM

FIELD OF THE INVENTION

The present invention relates generally to hardware, systems, and methods directed toward lattice-based cryptosystems, and, more particularly, relates to the Kyber cryptosystem which utilizes lattices as a method to perform key encapsulation mechanisms using the module learning with errors problem.

BACKGROUND OF THE INVENTION

Cryptology is the field of developing and implementing mathematical codes to allow for secure communication between two parties even in the presence of active or passively observing adversaries. Cryptographic algorithms can be utilized to provide assurances such as data confidentiality, data integrity, authentication, and non-repudiation. This allows parties to send and receive private messages with confidence that the information is both secure and accurate. Cryptosystems are a suite of algorithms that provide a particular service or set of services. They are often composed using complex mathematics and thus can often be costly in terms of performance as well as resources. In particular, lattice-based post-quantum algorithms, algorithms that are believed to remain secure even under attack from a quantum computer, lack low area implementations to support small IoT devices.

As research has continued into these lattice-based algorithms, much of the focus has been on increasing the performance of the algorithms to contend with current classical algorithms such as elliptic curve cryptography (ECC) and Rivest-Shamir-Adleman (RSA). Certain works present implementations which consume a small number of resources but are assisted by software and thus come with the performance limitations of software. For example, one known method and system presents a set of instruction set extensions for a RISC-V processor. While it has a low logic utilization, it is not a pure hardware architecture, has lower performance, and uses substantially more RAM than the invention presented in this document. Additionally, another known method and system presents low area hardware accelerators, but these require software assistance to perform the cryptographic operations. Other known methods and systems present pure hardware architectures for Kyber but targeting high performance and thus have a large footprint. Previous efforts do not provide reasonable solutions for small devices which will still need to be secured against quantum computing but cannot reasonably use the high-performance implementations with large footprints, yet still require reasonable performance.

Therefore, a need exists to overcome the problems with the prior art as discussed above.

SUMMARY OF THE INVENTION

The invention provides a full hardware architecture for implementing the Kyber Key Encapsulation Mechanism (KEM) with minimal area. This system is composed with a plurality of modules necessary to perform the polynomial generation and arithmetic required to generate the public key, private key, ciphertext, and shared secret value. The spirit of this invention is to provide an architecture with minimal resource consumption for the Kyber lattice-based cryptosystems.

This system provides an entire architecture for performing the Kyber cryptosystem operations of Chosen Ciphertext Attack secure ("CCA") key generation, encapsulation, and decapsulation at all three security levels (512, 768, 1024) described in the Kyber 3.0 specification. These operations call subfunctions that are Chosen Plaintext Attack secure ("CPA") functions for key generation, encryption, and decryption. The result is that these operations provide indistinguishability under adaptive chosen ciphertext attack (referred to as "IND-CCA2" security). It consists of the following primary modules: the decoder, encoder, compression/decompression modules; the binomial samplers for ($\eta=3$) and for ($\eta=2$); the rejection sampler; the operation unit and address generator for the Number Theoretic Transform (NTT); and the SHA3 Coprocessor for performing hashing and the extendible output function modes of the Keccak function. There are additionally two RAM modules, one for byte array data and one for polynomial coefficients, and one ROM for precomputed NTT parameters.

Design choices were made to minimize the resources required to implement these modules in hardware. This includes methods such as reuse of resources such as multipliers or modular arithmetic as well as performing operations sequentially so that minimal instances of modules may be used.

In one embodiment of the present invention, a hardware architecture implemented as a co-processor is disclosed that is operably configured to accelerate a plurality of cryptographic Kyber algorithms at all NIST-recommended post-quantum cryptography security levels.

In further embodiments of the present invention, the plurality of cryptographic Kyber algorithms are performed in a sequential manner.

In another embodiment of the present invention, a module is utilized that is operably configured to perform all arithmetic operations within the plurality of cryptographic Kyber algorithms.

In yet another embodiment of the present invention, the arithmetic operations include modular addition, modular subtraction, point-wise multiplication, the Cooley-Tukey butterfly, and the Gentlemen-Sande butterfly.

In an additional embodiment of the present invention, the module is a singular module operably configured to perform all arithmetic operations within the plurality of cryptographic Kyber algorithms. Further, the singular module may be operably configured to utilize a singular multiplier, a singular Barrett reducer, a singular modular adder, and a singular modular subtractor.

In a further embodiment of the present invention, the plurality of cryptographic Kyber algorithms include binomial sampling for all 11 values to be performed sequentially to generate a singular sample per iteration and reuses a plurality of adders and a modular subtractor In an exemplary embodiment of the present invention, the plurality of cryptographic Kyber algorithms reuse the plurality adders and a singular modular subtractor.

In an additional embodiment of the present invention, a module is utilized that is operably configured to perform the plurality of cryptographic Kyber algorithms that specify a compression and decompression algorithm configured to utilize a singular multiplier, a singular logical right shifter, and a singular logical left shifter.

In a further embodiment of the present invention, a division computation in the compression algorithm is estimated with multiplication by a q' and the singular logical right shifter and the singular multiplier.

In an additional embodiment of the present invention, a module is utilized that is singular and operably configured to perform the plurality of cryptographic Kyber algorithms that specify the compression and decompression algorithm configured to utilize the singular multiplier, the singular logical right shifter, and the singular logical left shifter.

In an additional embodiment of the present invention, the hardware architecture is implemented to reduce silicon area footprint.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 12 is a table showing exemplary performance and area results of the lattice-based architecture of FIG. 7 in accordance with one embodiment of the present invention.

DETAILED DESCRIPTION

Figure 1:
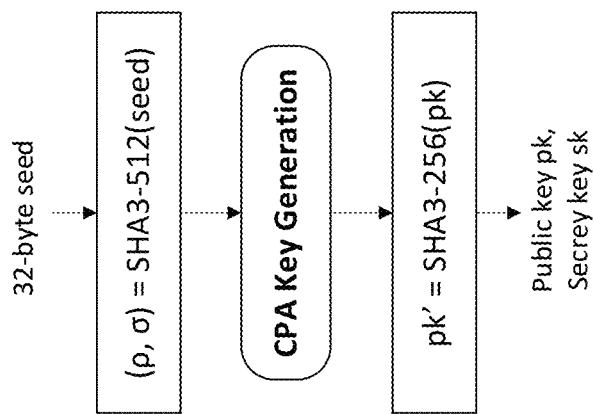
FIG. 1 is a process flow diagram depicting an order of instructions for CCA key generation.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient hardware architecture for implementing the Kyber lattice-based KEM. In particular, the invention provides modules and a combination of operations using those modules to implement the IND-CCA2 secure functions of key generation, encapsulation, and decapsulation at the security levels of 512, 768, and 1024, including the subfunctions of CPA secure key generation, encryption, and decryption.

Figure 2:
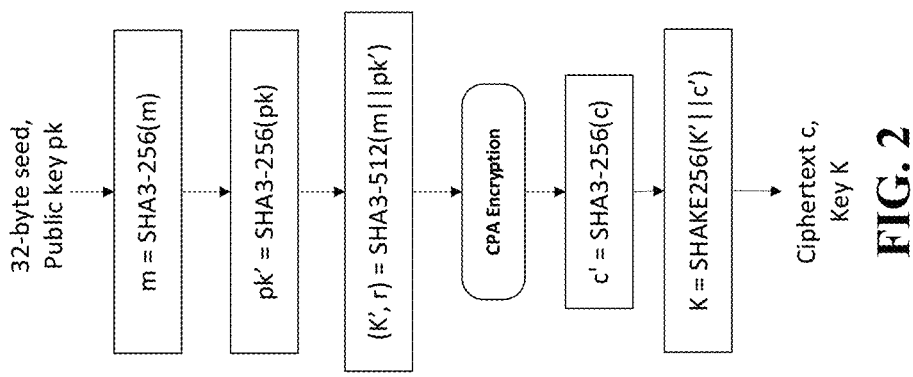
FIG. 2 is a process flow diagram depicting an order of instructions for CCA encapsulation.
Figure 3:
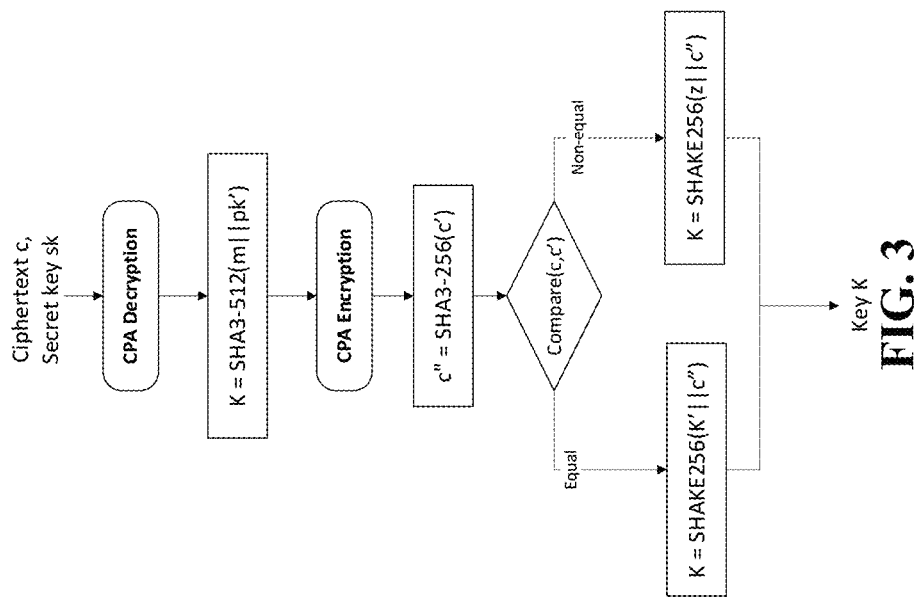
FIG. 3 is a process flow diagram depicting an order of instructions for CCA decapsulation.
Figure 4:
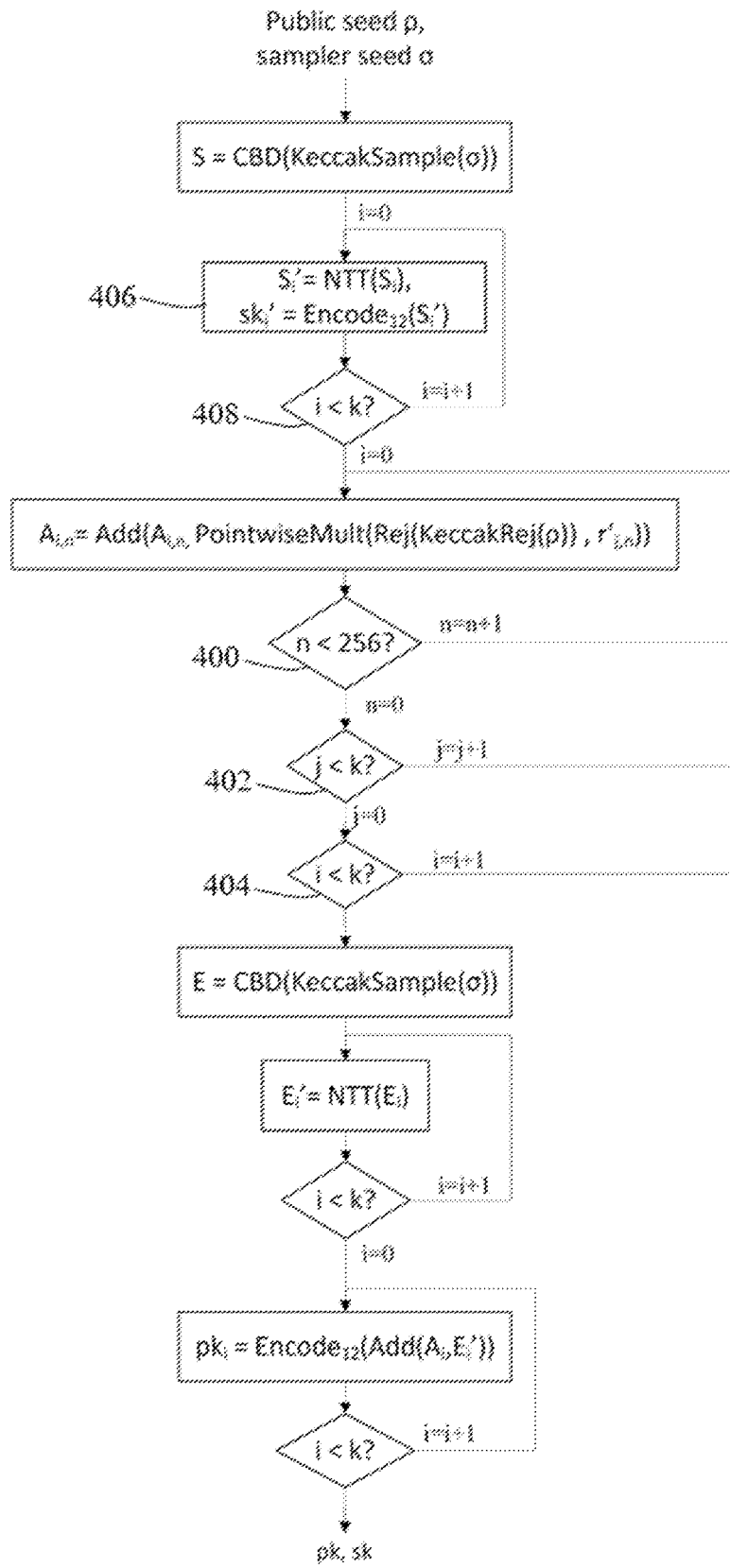
FIG. 4 is a process flow diagram depicting an order of instructions for CPA key generation.

With reference first to FIG. 1, said figure shows the order of instructions for performing the CCA key generation using one or more modules described herein. Said another way, the one or more modules may use a subfunction of CPA key generation described in FIG. 4 to complete this operation. FIG. 2 shows the order of instructions for performing the CCA encapsulation using one or more modules also described herein. The one or more modules may use the subfunction of CPA encryption described in FIG. 5 to complete this operation. FIG. 3 shows the order of instructions for performing the CCA decapsulation using one or more modules described herein. The one or more modules may use the subfunction of CPA encryption described in FIG. 5 as well as the subfunction of CPA decryption described in FIG. 6 to complete this operation.

Figure 5:
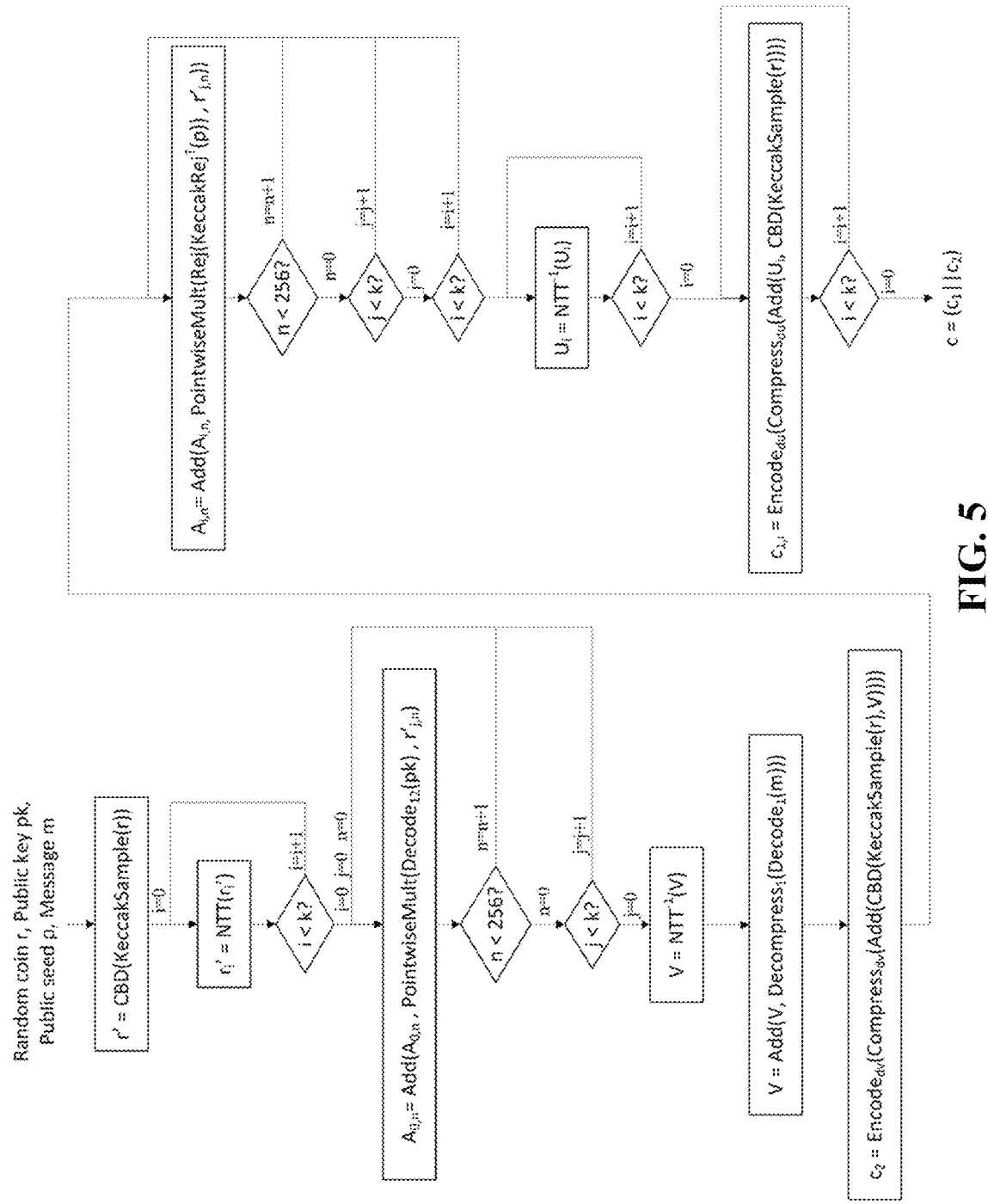
FIG. 5 is a process flow diagram depicting an order of instructions for CPA encryption.
Figure 6:
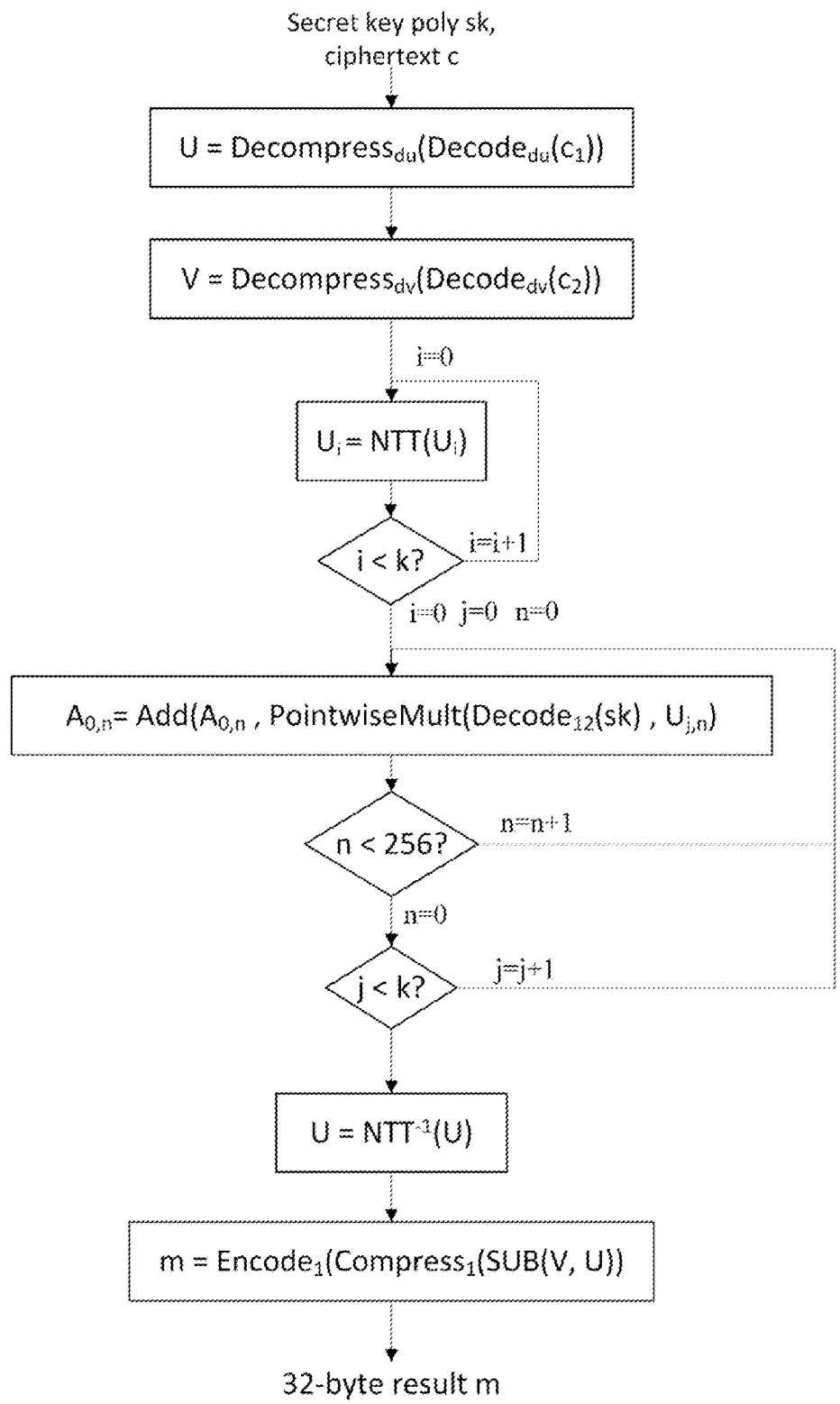
FIG. 6 is a process flow diagram depicting an order of instructions for CPA decryption.

In particular, FIGS. 1-6 show an exemplary sequential operation of one embodiment of the invention. Said another way, FIGS. 1-6 depict a plurality of cryptographic Kyber algorithms that are performed in a sequential manner. More specifically, with reference to FIG. 4, steps 400, 402, 404 perform the initial step of matrix multiplication in a sequential manner where $k^2$ polynomial multiplications are performed, each being point-wise. This result is accumulated in a in a k×1 vector of polynomials. Similarly, steps 406, 408 show how the NTT is sequentially applied to each polynomial in the vector. This same sequential operation occurs and is depicted in FIGS. 5-6. This highly sequential design for performing the operations of the Kyber algorithm require no duplication of modules, thereby minimizing the area or footprint.

Figure 7:
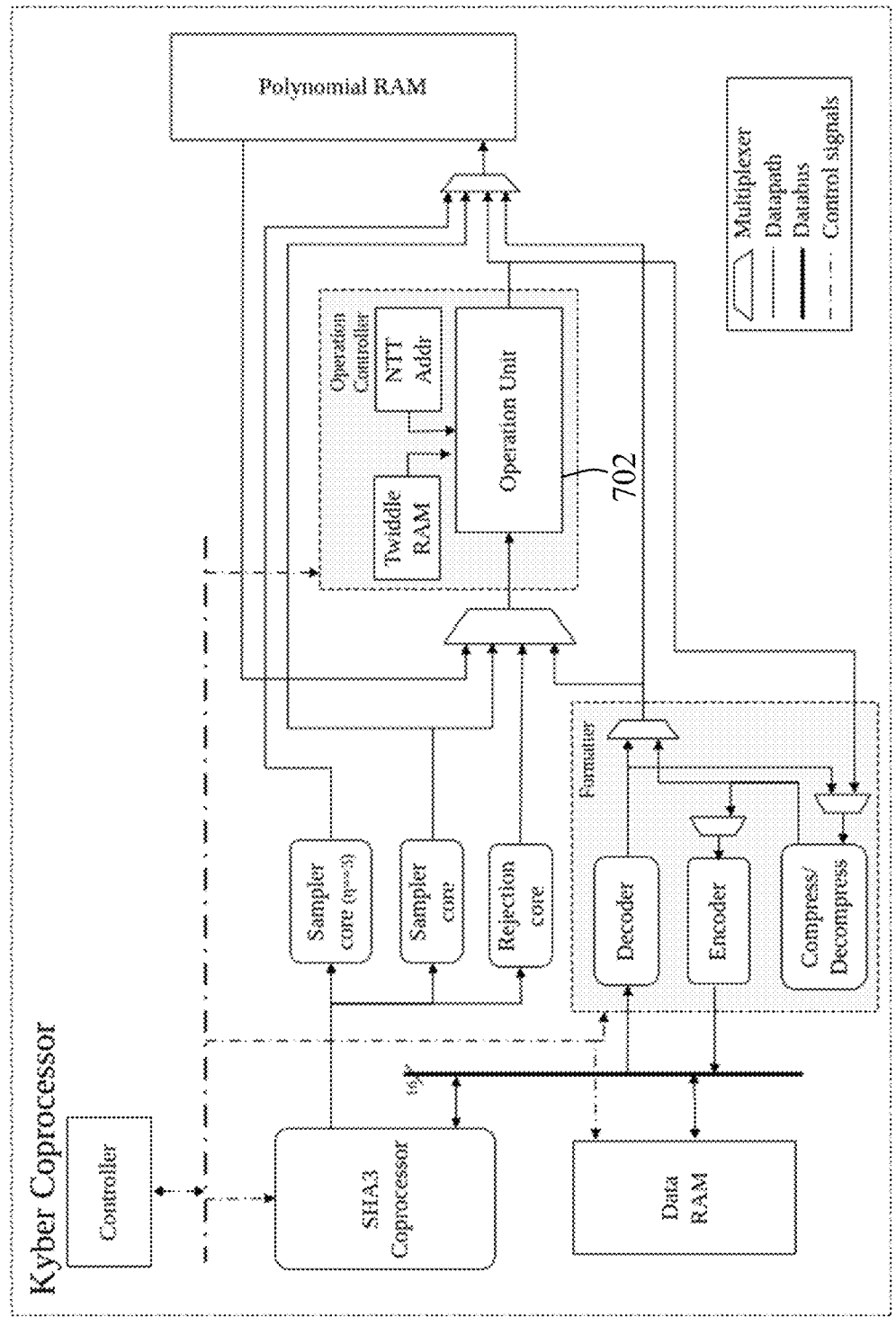
FIG. 7 is a schematic block diagram depicting a general form of a lattice-based architecture in accordance with one embodiment of the present invention.

One embodiment of an implemented accelerator or coprocessor 700 having a hardware architecture is depicted in FIG. 7. The hardware architecture depicted in FIG. 7 is implemented in a novel and efficient architecture for lattice-based computations to reduce silicon area footprint. In one embodiment, the accelerator or coprocessor 700 includes thirteen submodules. The submodules are operably configured to perform all Kyber algorithms including encapsulation, decapsulation, and key generation at all security levels. Each module may be instantiated only a single time to beneficially lower the footprint of the design or architecture. Additionally, as described and depicted in FIGS. 1-6, only one module that requires access to data stored in RAM operates at once to limit the area used for data movement. A SHA3-Coprocessor, for example, may be a publicly available open-source coprocessor implementation and is used for all hashing and pseudorandom data generation.

Figure 8:
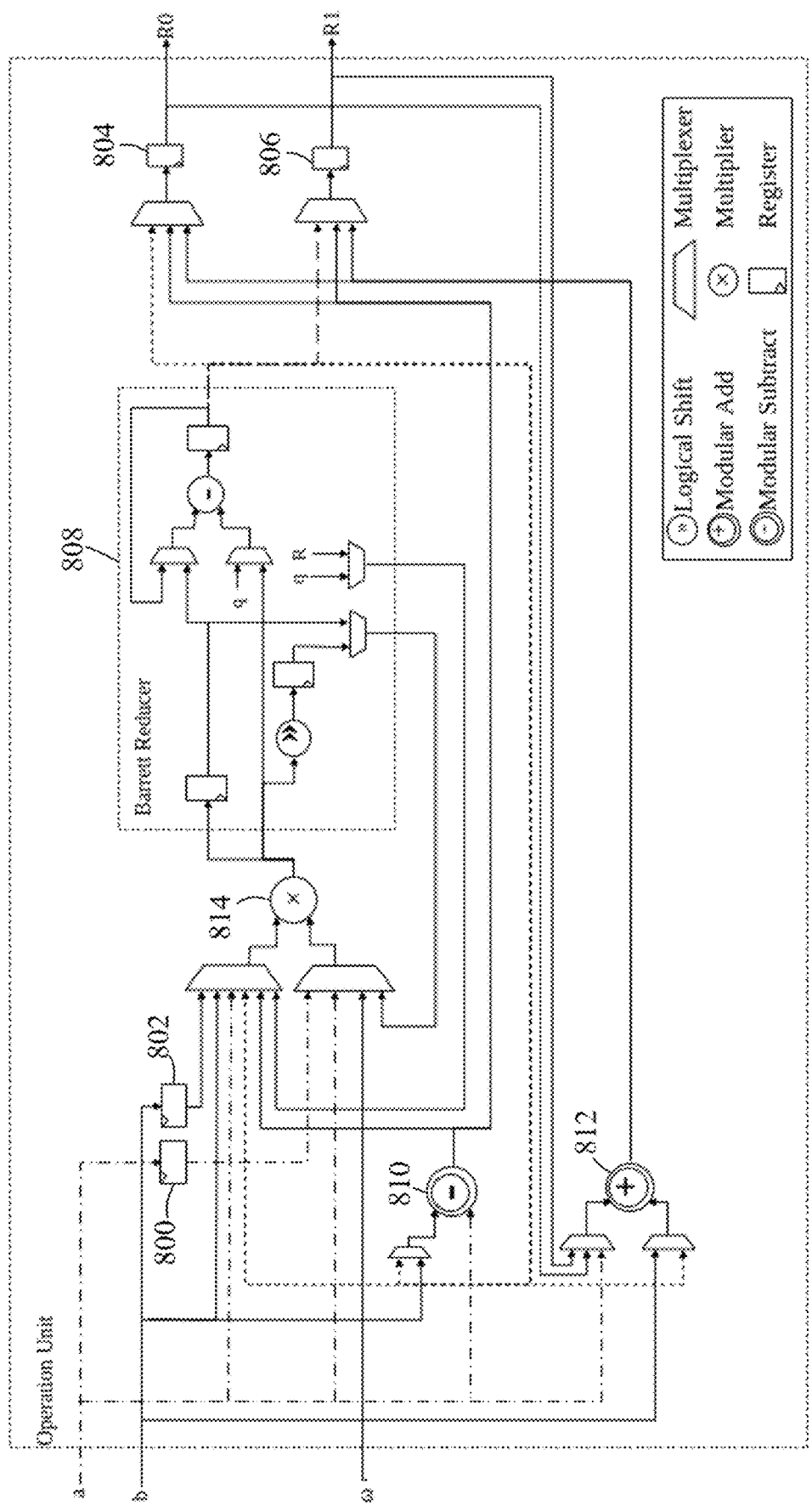
FIG. 8 is a schematic block diagram depicting an internal layout of an operation unit which performs all calculations for an accelerator in accordance with one embodiment of the present invention.

With reference to FIGS. 7-8, one embodiment of the present invention includes a low-area operation unit 702 which can perform all arithmetic operations required for Kyber such as a Cooley-Tukey butterfly operation, a Gentleman-Sande butterfly operation, a modular multiplication operation, a modular point-wise multiplication operation of two degree one polynomials, a modular addition computation, and a modular subtraction computation. All of these operations are beneficially performed in a sequential manner with reuse of resource. As such, the architecture depicted in FIGS. 7-8 may beneficially use only one multiplier, one modular adder, one modular subtractor, one subtractor, and one constant shift. Said another way, a singular module or operation unit 702 is operably configured to utilize a singular multiplier, a singular Barrett reducer, a singular modular adder, and a singular modular subtractor. For example, reduction by a Kyber modulus q=3329 for all multiplication is performed using a Barrett reduction with a constant value of R=5039 being used. There are one or more registers used for temporary storage, e.g., registers 800, 802, 804, 806. A Barret Reducer 808 beneficially reduces a value in the range [0,2q] to the range [0, q] using Barrett reduction. Said another way, the Barrett Reducer 808 is operably configured utilize the singular multiplier to implement Barrett reduction (as known to a person of skill in the art). A shared modular subtractor 810, a shared modular adder 812, and a shared multiplier 814 are also beneficially utilized.

Therefore, a hardware architecture can be seen implemented as a co-processor and operably configured to accelerate a plurality of cryptographic Kyber algorithms at all NIST-recommended post-quantum cryptography security levels, wherein NIST-recommended post-quantum cryptography security levels are readily ascertainable by those of skill in the art. Still with reference to FIG. 7, it can be seen that the Kyber coprocessor includes an internal controller. This internal controller is operably configured to perform the algorithms as described in FIGS. 1-6 using the modules shown in FIG. 7 and described in this specification. Thus, the coprocessor described in this specification is capable of independently performing the plurality of algorithms described in Kyber with no need for an external processor or module to schedule instructions.

Figure 9:
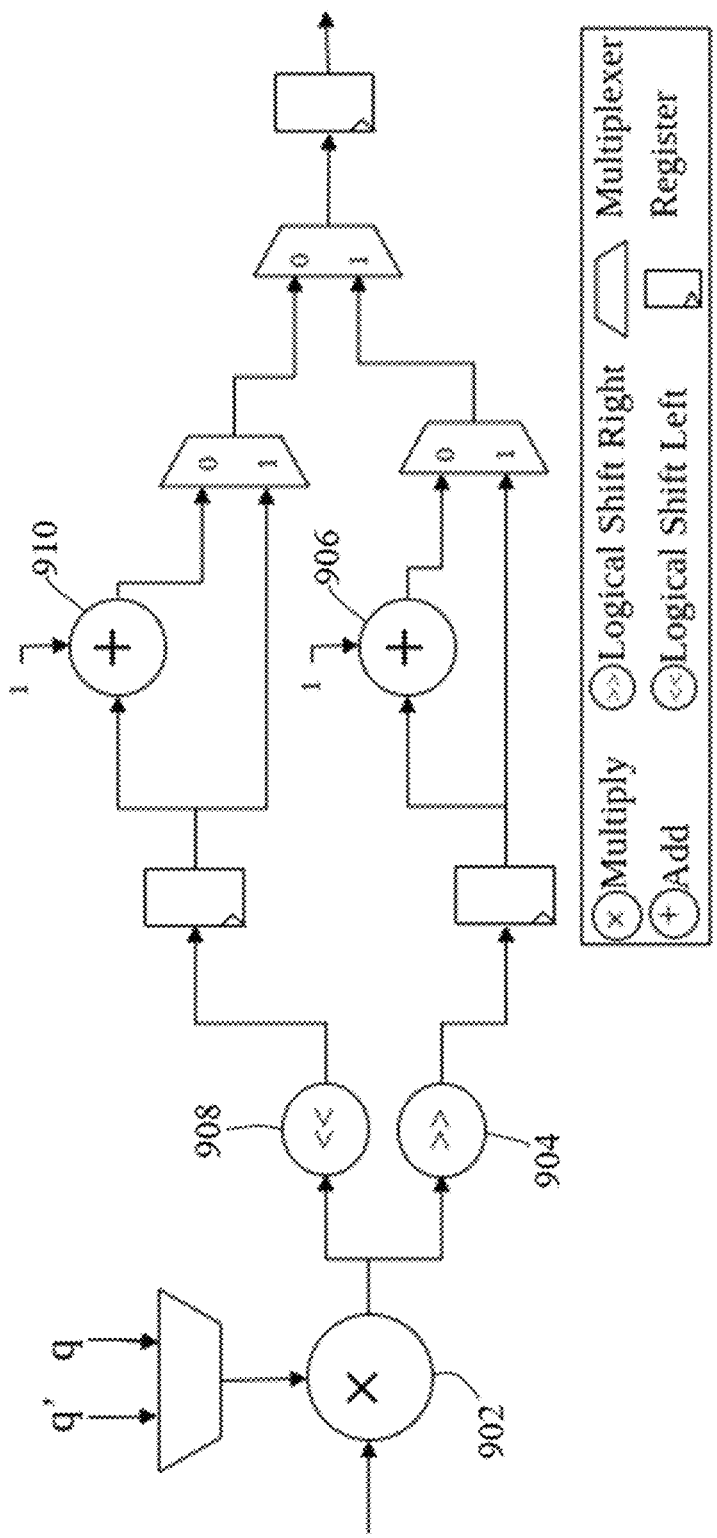
FIG. 9 is a schematic block diagram depicting an internal layout of a module used for compressing and decompressing polynomial coefficient values in accordance with one embodiment of the present invention.

With reference to FIG. 9, an exemplary design of an internal layout of a module 900 used for compressing and decompressing polynomial coefficient values is depicted. This module 900 is capable of performing both compression and decompression at all level specified in Kyber using, for example and beneficially, a single multiplier, a single logical left shift, a single logical right shift, and two incrementors. In compression, for example, division by q is estimated with multiplication. This is calculated by using $q'=2^{35}/q=10321339$ in the equation $x/q \approx (x*q')/2^{35}$ which is efficiently implemented using the multiplier and logical right shift. Since these operation round the decimal component, the incrementor is used to account for values that should be rounded up instead of floored. A compression at level l is performed as follows: the input value is multiplied by q' using the multiplier 902. The result is then shifted right 35–l bits by the logical right shifter 904 (that may be preferably singular—as depicted). This is to complete the division estimate as well as the multiplication by $2^l$. Then, to account for the rounding if bit 34–l of the multiplication result is 1, the result is incremented by a modular adder 906. For decompression at level l, the input value is multiplied by q using multiplier 902. It is then left shifted by l bits by the logical left shifter 908 (that may be preferably singular—as depicted) to complete the division by $2^l$. As before, if bit l–1 of the multiplication result is 1, the result is incremented by a modular adder 910 to account for rounding.

Figure 10:
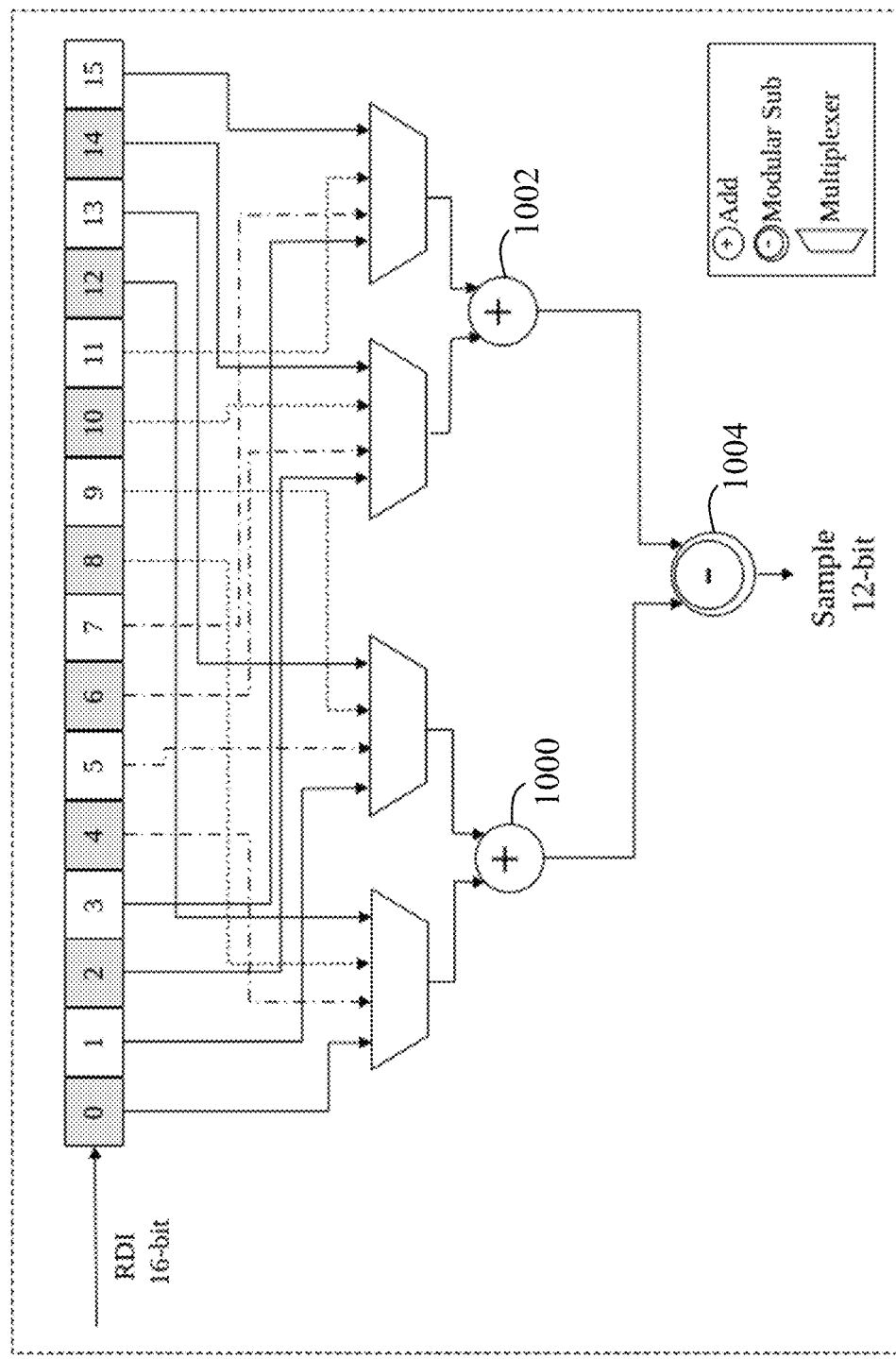
FIG. 10 is a schematic block diagram depicting an internal layout of a sampler for a centered binomial distribution for ($\eta$=2) in accordance with one embodiment of the present invention.
Figure 11:
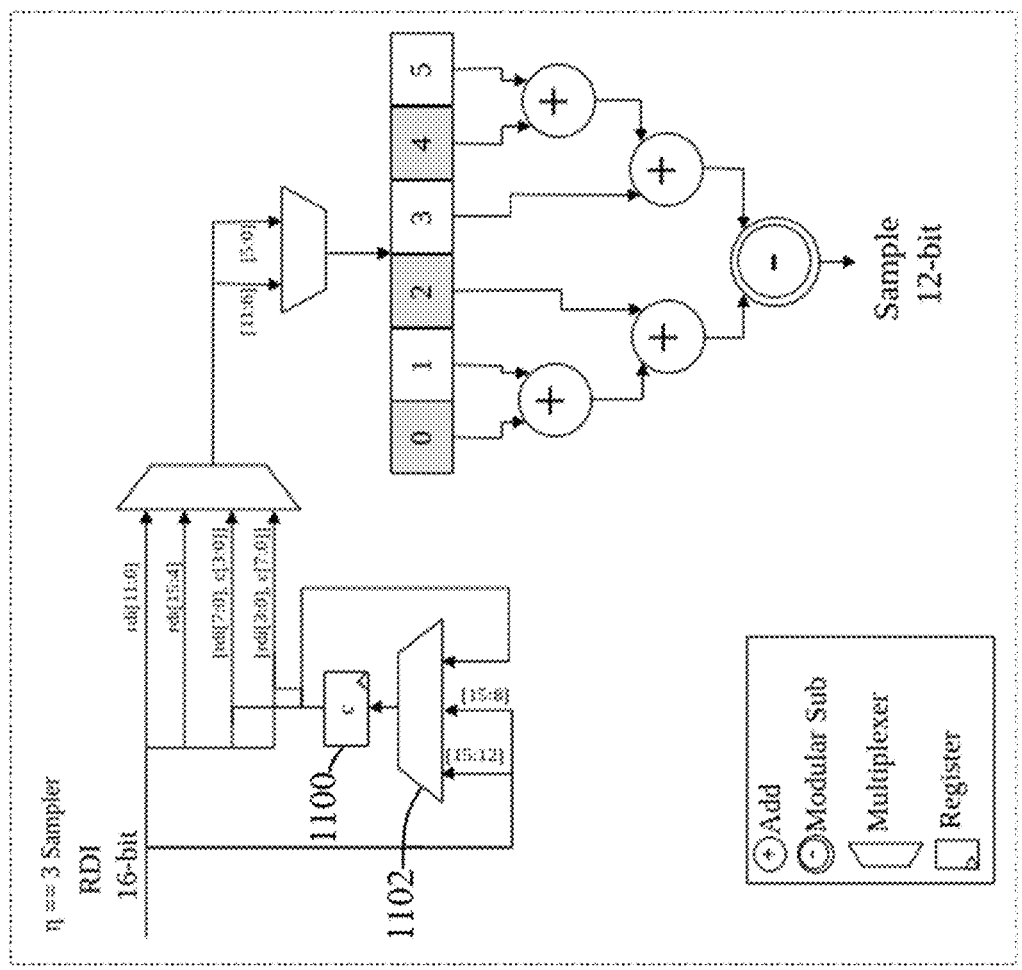
FIG. 11 is a schematic block diagram depicting an internal layout of a sampler for a centered binomial distribution for ($\eta$=3) in accordance with one embodiment of the present invention.

FIGS. 10-11 embody a design of binomial sampler modules. In particular, FIG. 10 shows an embodiment of the design for (η=2) and FIG. 11 for (η=3). These modules are in a strictly sequential manner, using a single set of bit-adders which are used on different portions of the input. As shown in FIG. 10, the input is a 16-bit value which is used to sequentially generate four samples using modular adders 1000, 1002 and a modular subtractor 1004. For the (η=3) sampler shown in FIG. 11, for example, additional logic is needed because the number of bits needed to generate a sample does not evenly divide the 16-bit input. This additionally logic may be handled by a register 1100 that may include or contains any remaining bits between valid inputs.

A demultiplexer circuit 1102 may select what values are held in register 1100 and/or demultiplexer circuit 1104 and selects the proper combination of input bits and bits from register 1100. FIG. 12 depicts a table showing exemplary performance and area results of the lattice-based architecture of FIG. 7 in accordance with one embodiment of the present invention.

What is claimed is:

1. A hardware architecture for Kyber-KEM comprising:
   a co-processor implemented in the hardware architecture and with an internal controller operably configured to independently accelerate a plurality of cryptographic Kyber algorithms at all NIST-recommended post-quantum cryptography security levels, the internal controller operably coupled to a singular module utilizing at least one of a shifter, a multiplier, and a reducer and the internal controller is operably configured to:
      perform compression and decompression as specified in Kyber;
      perform arithmetic operations utilized in the plurality of cryptographic Kyber algorithms; and
      reuse hardware resources for all the arithmetic operations utilized in the plurality of cryptographic Kyber algorithms.

2. The hardware architecture according to claim 1, wherein:
   the plurality of cryptographic Kyber algorithms are performed in a sequential manner.

3. The hardware architecture according to claim 1, wherein:
   the arithmetic operations include modular addition, modular subtraction, modular point-wise multiplication, modular multiplication of two degree one polynomials, the Cooley-Tukey butterfly, and the Gentlemen-Sande butterfly.

4. The hardware architecture according to claim 1, wherein:
   the singular module is operably configured to utilize a singular multiplier, a singular Barrett reducer operably configured utilize the singular multiplier to implement Barrett reduction, a singular modular adder, and a singular modular subtractor.

5. The hardware architecture according to claim 1, wherein:
   the singular module is operably configured to utilize a singular multiplier, a singular Barrett reducer, a singular modular adder, and a singular modular subtractor.

6. The hardware architecture according to claim 1, wherein:
   the plurality of cryptographic Kyber algorithms include binomial sampling for all η values to be performed sequentially to generate a singular sample per iteration and reuses a plurality adders and a modular subtractor.

7. The hardware architecture according to claim 6, wherein:
   the plurality of cryptographic Kyber algorithms reuse the plurality adders and a singular modular subtractor.

8. The hardware architecture according to claim 1, wherein:
   the singular module is operably configured to perform compression and decompression utilized in the plurality of cryptographic Kyber algorithms with utilization of a singular multiplier, a singular logical right shifter, and a singular logical left shifter.

9. The hardware architecture according to claim 8, wherein:

a division computation in the compression algorithm is estimated with multiplication by a q' and the singular logical right shifter and the singular multiplier.

10. The hardware architecture according to claim 8, wherein:
the singular module is operably configured to perform the plurality of cryptographic Kyber algorithms that specify the compression and decompression algorithm configured to utilize the singular multiplier, the singular logical right shifter, and the singular logical left shifter.

* * * * *